(No Model.)

C. H. FOGG.
STARTING AND STOPPING MECHANISM.

No. 595,707. Patented Dec. 21, 1897.

Witnesses.

Inventor.
Chas H Fogg.

UNITED STATES PATENT OFFICE.

CHARLES H. FOGG, OF HYDE PARK, MASSACHUSETTS, ASSIGNOR TO JAMES W. BROOKS, PRINCIPAL TRUSTEE, OF PETERSHAM, AND JOHN BROOKS, ASSOCIATE TRUSTEE, OF CAMBRIDGE, MASSACHUSETTS.

STARTING AND STOPPING MECHANISM.

SPECIFICATION forming part of Letters Patent No. 595,707, dated December 21, 1897.

Application filed March 31, 1897. Serial No. 630,021. (No model.)

*To all whom it may concern:*

Be it known that I, CHARLES H. FOGG, a citizen of the United States, residing at Hyde Park, in the county of Norfolk and State of Massachusetts, have invented a new and useful Improvement in Starting and Stopping Mechanism, of which the following is a full, clear, and exact description, reference being had to the accompanying drawings, forming a part of this specification, in explaining its nature.

The invention relates to the herein-described improvement in starting and stopping mechanisms whereby a machine is started and automatically disengaged from its starting devices and automatically stopped.

Figure 1:
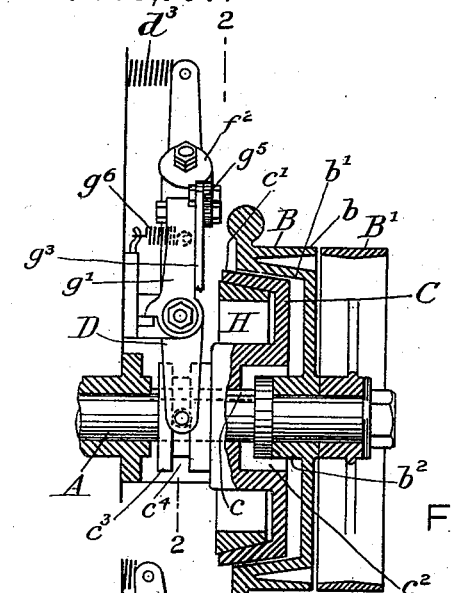
Figure 2:
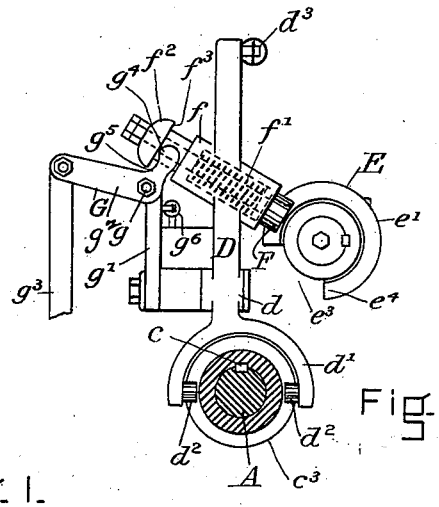
Figure 3:
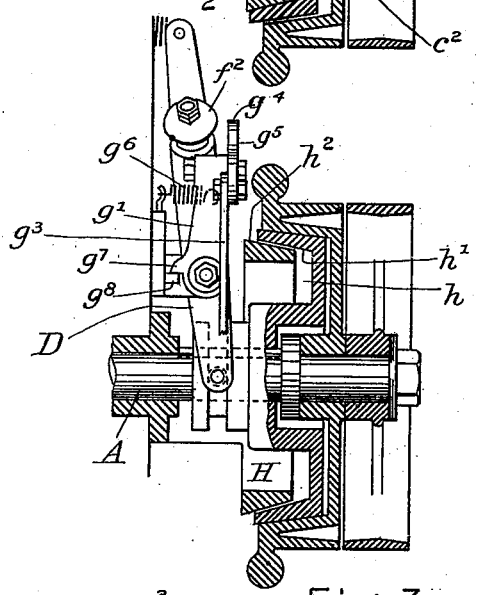
Figure 4:
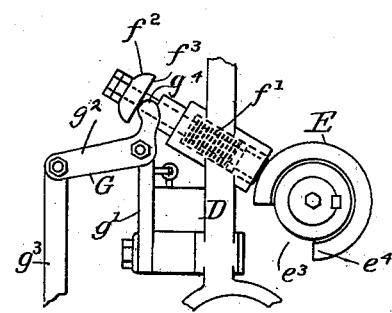
Figure 5:
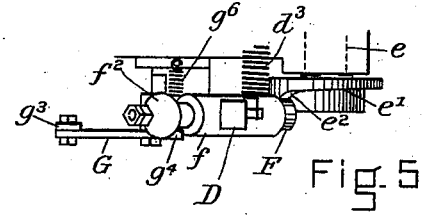
Figure 6:
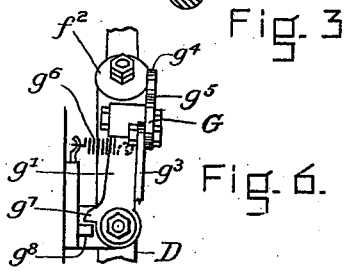

Figure 1 is a view, principally in vertical section, of the main shaft of a machine and my improved devices. Fig. 2 is a view in vertical section upon the dotted line 2 2 of Fig. 1. Fig. 3 is a view of the parts represented in Fig. 1 when the driven member of the clutch is in engagement with the driving member. Fig. 4 is a view in side elevation representing a portion of the operative devices when in the position shown in Fig. 3. Fig. 5 is a detail view, in plan, of the devices shown in Fig. 2. Fig. 6 is a detail view, in front elevation, of said devices.

A is the main shaft of the machine.

B is a fly or balance wheel mounted upon the shaft to turn freely thereon and having the belt-surface $b$ and the section or part $b'$ of a clutch, which preferably is conical in shape, being the outer surface of a conical chamber or cavity in the inner face of the wall. Said shaft may also have the loose belt-wheel B'. There is also mounted upon the shaft the clutch member or wheel C. This is fast to the shaft by a feather $c$, upon which it is adapted to be moved lengthwise the shaft, and its outer conical surface $c'$ is adapted to engage the surface $b'$ of the fly-wheel when moved into contact and held in contact therewith. It has in its hub the recess $c^2$ to provide room for the hub $b^2$ of the fly-wheel. The clutch-wheel C has a hub or hub extension $c^3$, in which is the annular recess or groove $c^4$, and the said clutch-wheel is moved toward and from the wheel B by means of a lever D, (see Fig. 2,) which is pivoted at $d$, has the forked lower end $d'$ to span the recess or groove $c^4$, and which engages the said groove or recess by means of the pins $d^2$. The lower end of this lever is moved inward to move the clutch-wheel C into contact with the fly-wheel B by the spring $d^3$, attached to its upper end, and the said spring also serves to hold the two members of the clutch in engagement. The lever is moved to disengage the driven member C of the clutch from the driving member by the cam E upon a shaft $e$, (see Figs. 2, 4, and 5,) and which shaft may be revolved at a less or a greater speed than the main shaft, generally at a less speed.

The cam is formed on the face of a disk, has the long slow rise $e'$ ending in a sharp rise $e^2$, and it is cut away at $e^3$. (See Figs. 2 and 4.) The lever D is connected with the cam by means of a sliding bolt or pin F, (see Figs. 2 and 4,) which is mounted in a housing or casing $f$, preferably forming a part of the lever, although it may be attached thereto. This bolt or pin F is held in contact with the surface of the cam by the spring $d^3$, and thereby serves to hold, when the cam is at rest, the driven member of the clutch from the driving member of the clutch, as shown in Fig. 1. Said pin or bolt upon being drawn radially from the section $e^2$ of the cam to the position represented in Fig. 4 allows the spring $d^3$ to move the driven member of the clutch into engagement with the driving member of the clutch and to hold it in such engagement until the cam has been turned sufficiently to again come into contact with the pin or bolt and move it, and thereby the lever, to the original or stopping position of both. The bolt or pin F is moved outward from the cam-surface in opposition to the stress of the returning-spring $f'$, which preferably is contained within the housing $f$, surrounds the portion of the bolt therein, bears at one end against the end of the bolt-holding recess in the housing and at the other end against the bolt, and this spring or bolt serves to return the bolt or spring into the cam-recess $e^3$ when the cam has been turned sufficiently to bring the said recess into line therewith, the bolt or pin being by that time released from the device which moves it outward or disengages it from the cam, so that it is at liberty to be returned by the said spring $f'$ to its original or normal position. The section $e^4$ of the cam, which is constantly turning, then runs behind the bolt or pin and coming in contact therewith causes the lever D to move the driven member of the clutch from contact with the driving member and into contact with the brake. (See Fig. 1.)

The cam preferably has near its rear end a sharp rise $e^2$, which comes into action preferably after the driven member has been disengaged from the driving member and after the momentum of the machine has been somewhat checked and serves as a sort of positive lock, at which point the machine must stop, the driven member then being completely disengaged from the driving member and also forced hard against the brake, and the said section of the cam cannot pass beyond the pin without breaking it or some connection.

The pin or bolt F is disengaged from the cam to start the machine by means of the bell-crank lever G, which is pivoted at $g$ to the upper end of a swinging arm or support $g'$. The arm $g^2$ of the bell-crank is connected by a link $g^3$ with a treadle. (Not shown.) The end $g^4$ of the arm $g^5$ is alternately connected and disconnected with the head $f^2$ of the bolt or pin F. It is connected with said head when the machine is at rest and the parts are in the position represented in Figs. 1 and 2, being then behind the flat surface $f^3$ of said head. It is allowed to take such position because of the swinging support or arm $g'$ and the spring $g^6$, (see Figs. 1, 3, and 6,) the spring drawing the arm inward toward the frame of the machine and moving the end $g^4$ of the bell-crank inward behind the head $f^2$ and holding it there not only while the machine is at rest, but also during the movement of the treadle in starting the machine, this movement of the treadle causing the end $g^4$ of the bell-crank to press against the head of the bolt or pin and move the bolt or pin from the position represented in Fig. 2 to the position represented in Fig. 4. The release of the treadle then permits the bell-crank to be returned to its original relation with the said head $f^2$, the end $g^4$ of the bell-crank riding over the rounded outer surface $f^4$ of the head $f^2$ if it has not previously been released and returned. The arm or support $g'$ yielding outwardly slightly permits this to take place and then being drawn inward by its spring and drawing the end $g^4$ of the bell-crank behind the face or shoulder $f^3$. The treadle-lifting spring (not shown) causes the bell-crank lever to be thus moved backward.

It will be understood that the drawing of the pin or bolt F from the cam upon the starting of the machine changes the position of the lever D from that shown in Fig. 1 to that represented in Fig. 3 and that this removes the pin or bolt and its head $f^2$ from the line upon which the end $g^4$ of the bell-crank lever is operative, and that an operative relation cannot again be established between them until the lever D has been restored by the cam to the position represented in Fig. 1. To prevent the arm or support $g'$ from being moved inward sufficiently to make an engagement between the bell-crank and the head possible when the lever is in the position shown in Fig. 3, I have provided said arm or lever with a stop $g^7$, which is arranged to come into contact with the projection $g^8$, and thereby limit the extent of the inward movement of the bell-crank. If the treadle is released after the machine has come to rest, then the end of the bell-crank will ride over the rounded end of the pin or bolt head $f^2$ to make its new engagement therewith. If the treadle is released before the machine comes to rest and the bell-crank is returned to its original position before such time, then the head $f^2$ will close over the end of the bell-crank. It will be seen that by this mechanism the movement of the bell-crank causes the bolt or pin to be disengaged from the cam E and the members of the clutch to be engaged and the machine to be started, and that also the bell-crank is immediately disengaged from the head or pin because of the lateral movement of the head from it, and that continued pressure upon the treadle or bell-crank will not cause a second starting of the machine, that the machine is automatically stopped by the release of the bolt or pin F and the reëngagement of the cam E therewith, and that the machine cannot be again started until the bell-crank lever has been released and permitted to return to make a new connection with the head of the bolt or pin.

The driven clutch-wheel C has upon its inner face a cavity $h$, which has a conical surface $h'$, and this is adapted to be brought into contact with the conical surface $h^2$ of a stationary brake-disk H when the said driven wheel C is disengaged from the driving-wheel, the said engagement between the driven wheel and the brake being provided by the section $e^2$ of the cam, which causes the lever D to move the driven wheel C backward sufficiently to bring the conical surface $h'$ thereof into forcible contact with the conical surface $h^2$ of the said brake, and the said cam serves to hold said driven wheel in contact with the brake. The brake-disk is fastened to the frame of the machine. It is desirable that the end of the pin or bolt F which bears upon the cam be provided with an antifriction-roll.

It will be understood that, if desired, the cam E and the spring $d^3$ may be reversed in respect to their actions—that is, the cam may be used to bring the driven member of the clutch into engagement with the driving member and the spring used for releasing the driven member and for moving it into contact with the brake.

Having thus fully described my invention, I claim and desire to secure by Letters Patent of the United States—

1. In a starting and stopping mechanism, the combination of a driving clutch member, a driven clutch member, a lever D connected therewith, a spring $d^3$ to act upon the lever, a cam E, a releasing bolt or pin F carried by the lever, a spring to move it in one direction, means for alternately engaging said pin to move the same and disengaging the same.

2. The combination, in a starting and stopping mechanism, of a driving member of a clutch, a driven member, a lever D to move the driven member, a spring $g^3$, the releasing and stop cam E, the releasing bolt or pin F carried by the lever, its spring $f'$, a head or shoulder thereon, the engaging arm $g^5$, means for moving the same and a swinging arm or support $g'$ upon which said arm $g^5$ is mounted, the spring $g^6$ and the stop $g^7$, as and for the purposes described.

3. The combination of the driven member of a clutch having the recess $h$ and conical surface $h'$, the stationary disk H having the conical surface $h^2$, the lever D connected with the said driven member, the cam E, as and for the purposes described.

4. The combination of the driving member of a clutch having the recess and inclined surface $b'$, a driven member of a clutch having the exterior conical surface $c'$, the side recess and interior conical surface $h'$, the disk H having the conical surface $h^2$, the lever D engaging the driven member of the clutch, its spring $d^3$, cam E, releasing pin or bolt F, its spring $f'$ and bolt moving and tripping devices.

CHAS. H. FOGG.

Witnesses:
F. F. RAYMOND, 2d,
J. M. DOLAN.